United States Patent [19]

Sprengel et al.

[11] Patent Number: 5,660,944
[45] Date of Patent: Aug. 26, 1997

[54] MULTICELL STORAGE BATTERY

[75] Inventors: Dietrich Sprengel, Halver; Uwe Köhler; Eberhard Niggemann, both of Kelkheim, all of Germany

[73] Assignee: Varta Batterie Aktiengesellschaft, Hanover, Germany

[21] Appl. No.: 404,291

[22] Filed: Mar. 14, 1995

[30] Foreign Application Priority Data

Mar. 31, 1994 [DE] Germany ............... 44 11 289.0

[51] Int. Cl.⁶ ................................. H01M 10/48
[52] U.S. Cl. ............................ 429/93; 429/92; 429/90
[58] Field of Search ................... 429/90, 93, 92, 429/61, 54, 56

[56] References Cited

U.S. PATENT DOCUMENTS 3,818,325  6/1974  Boshers ................. 429/90 X
4,788,112  11/1988  Kung ...................... 429/54
5,171,648  12/1992  Beard ..................... 429/90 X
5,405,715  4/1995  Dawson et al. ........... 429/61 X

FOREIGN PATENT DOCUMENTS 6751613  2/1969  Germany.

Primary Examiner—John S. Maples
Attorney, Agent, or Firm—Weiser & Associates, P.C.

[57] ABSTRACT

A multicell storage battery, especially of the nickel/hydride type, is provided with pressure safeties for protection against high internal pressures. The pressure safeties respond at a preassigned critical pressure, causing mechanical changes in shape or through destruction which can be optically or electrically monitored. For example, a hinged lid is caused to swing up responsive to a rupture disk, interrupting a light beam. Alternatively, a rupture disk is coated with a conducting enamel and is connected by lead wires to form an electrical circuit which is interrupted responsive to damage of the enamel layer (e.g., responsive to bursting of the membrane).

16 Claims, 3 Drawing Sheets

MULTICELL STORAGE BATTERY

BACKGROUND OF THE INVENTION

The present invention relates primarily to multicell storage batteries which are normally sealed in a gas-tight manner.

In gas-tight batteries, overcharging or charging with too high a current, as well as reversals in polarity, can produce high internal gas pressures (i.e., gassing) which can ultimately lead to cell bursting. For this reason, steps are conventionally taken to control such excess pressures and their related safety risks. The smaller batteries can be provided with weakened areas, forming "nominal failure points" on the housing. The larger batteries can be provided with pressure relief valves or rupture disks for achieving the desired result.

A preferred field of application for the improvements of the present invention is in prismatic nickel/hydride cells. This especially pertains to batteries having a plurality of cells, in particular, those developed as power sources for electric-powered street vehicles (i.e., traction batteries). Prismatic nickel/hydride cells have the advantage over round cells of better economy of space, but often lack the necessary stability in terms of their shape in the event of excessive gas pressures under extreme operating conditions. Prevention of the deformation of the cell housing by the timely release of gas, or the bursting of a rupture disk, is especially important in such cases.

In the absence of corrective measures, bulging usually accompanies disturbances in the cells such as heating and voltage deviation (downward in the case of a load, upward in the case of a charge, etc.). At times, a dangerous state is reached, which can lead to highly progressive damage. This is especially so in cases where the gassing and/or bulging is not noticed and operation of the (essentially dried-out) cell is continued. In such case, a cell may come to be filled with an ignitable gas mixture, and may overheat because the electrolyte level is too low or due to failure of the separator. This can lead to a short circuit, which may then trigger an ignition. The result is an explosion, destruction of the battery, and potential safety concerns.

As a rule, this result is preventable by appropriate safety measures, as previously noted. However, such measures can themselves lead to certain deficiencies. For example, while pressure relief valves assure a reclosure of the cell, and accordingly, a lengthening of the cell's operating life, no clear signal is given to indicate damage to the cell. The flow resistance of the open valve is at time so great that the available opening (cross-section) is insufficient to handle the blow-off of collected gases. In the case of a strong overcharging (e.g., with $10 \times I_5$ to $20 \times I_5$) and an unlimited voltage, the pressure in the cell can rise so fast that the generated gases cannot flow out through the blow-off valve rapidly enough. The result is that the cell will burst.

In such cases, replacement of the valve with a more simply constructed, lighter and more economical rupture disk is recommended. This is because even a correctly functioning valve will not always prevent slow (progressive) damage to the cell by releasing gas. A rupture disk will burst so that damage to the cell is made obvious and the cell can be immediately replaced. However, in either case (i.e., when a valve is used and also when a rupture disk is used), it is nevertheless important that a loss of gas be indicated in some way.

German Utility Patent No. 67 51 613 discloses a pressure safety release capable of direct visual monitoring. To this end, a burstable membrane is provided which can be destroyed by a bursting needle. In addition, a colored (and therefore more easily observed) visible membrane is provided to protect against the outer atmosphere. However, the visible membrane has a bursting pressure which is lower than the response pressure of the bursting membrane. As a result, if the bursting membrane is destroyed, this results in an immediate load upon and destruction of the visual membrane. An immediate response to such an event would require that the maintenance person always be near and attentive.

SUMMARY OF THE INVENTION

It is therefore the primary object of the present invention to provide a more easily monitored battery, with an integrated pressure safety release.

This and other objects are achieved in accordance with the present invention by providing each of the cells of a storage battery, primarily a storage battery with a plurality of cells which are normally sealed in gas-tight manner, with a pressure safety which is responsive to a preassigned excess in internal pressure and which undergoes a mechanical change in the shape of its structural parts. The pressure safeties are linked to a monitoring device which is responsive to such changes in shape, either optically or electrically.

It has been found that mechanical changes in the shape of a pressure safety at the moment of its response (e.g., when a bursting membrane tears or when a valve stem moves) are well suited to breaking a connection between the pressure safeties and the monitoring device. The monitoring device can in turn provide an indication of the disconnection either with an optical signal or an electrical signal. The change in shape of the pressure safety is advantageously achieved by interrupting an electrically conducting connection or by blocking the path of a light beam (which runs along the pressure safeties, which are arranged in a row). The interruption of this "signal line" then triggers an electrical or optical signal in the monitoring device. As a result, responses of the pressure safeties can be signaled (to the operator of the battery), even when the battery is not clearly visible (e.g., in a closed battery chamber).

For further detail regarding the monitoring device of the present invention, reference is made to the description provided below, taken in conjunction with the following illustrations.

BRIEF DESCRIPTION OF THE DRAWINGS

FIG. 3b is a top plan view of the rupture disk of FIG. 3a.

FIG. 9 is a partial, cross-sectional view of a multicell battery fitted with a plurality of pressure safeties similar to the pressure safety of FIG. 8a.

DETAILED DESCRIPTION OF PREFERRED EMBODIMENTS

Figure 1:
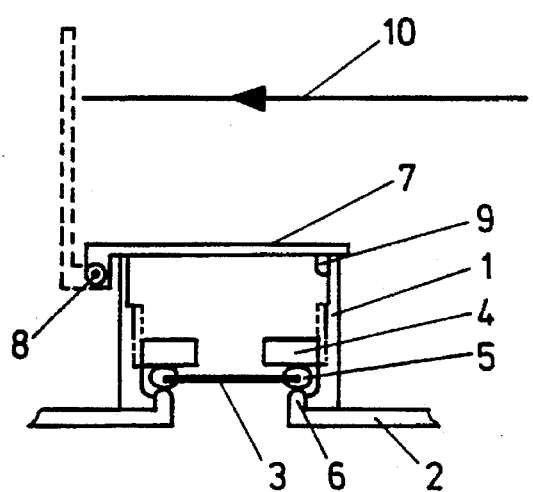
FIG. 1 is a cross-sectional view of a non-reclosing valve flap provided in accordance with the present invention.

FIG. 1 shows an opening in the cover 2 of a cell, which is surrounded by a tube 1 including a rupture disk 3. The rupture disk 3 is received by a sealing washer 5, which is in turn received between a press nut 4 and a flange 6 formed in the cover 2 to form a hermetic seal. The outer edge of the tube 1 includes a cap 7, and a hinge 8 connects the cap 7 and the tube 1. A snap 9 is provided to retain the cap 7 in a normally closed position.

A light beam (schematically shown at 10) passes through the cell arrangement. If the rupture disk 3 bursts (upon reaching a preassigned internal pressure), the cap 7 is caused to swivel upwardly and block the path of the light beam 10, optically indicating the activation of one of the pressure safeties. This is of particular advantage in a battery with a plurality of cells, formed in a row. By causing the light beam to pass along a suitable "photoline", each of the plurality of cells can be monitored with a single sensor.

Figure 2:
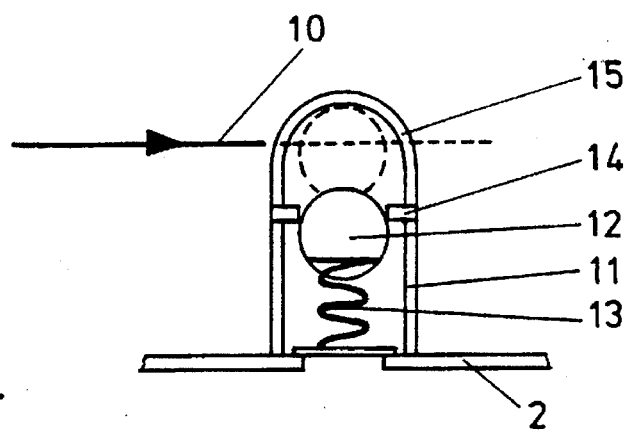
FIG. 2 is a cross-sectional view of a non-reclosing ball valve provided in accordance with the present invention.

FIG. 2 shows an alternative embodiment system for achieving a similar result. In this configuration a holder 11 is positioned over the opening in the cover 2. The holder 11 includes a flange 14, and a ball 12 is pressed (in sealing engagement) against the flange 14 by a pressure spring 13. The ball 12 has a diameter greater than that of the annular flange 14, which serves to hold the ball 12 in a "closed" position. When a preassigned internal pressure is exceeded, the ball 12 is pressed (forced) into a cage 15 extending over the holder 11. As a result of this, a light beam 10 passing through the cage 15 is interrupted, optically indicating the activation of one of the pressure safeties. The ball valve 12 remains in this "open" state resulting from interaction between the ball 12 and the flange 14.

Figure 3A:
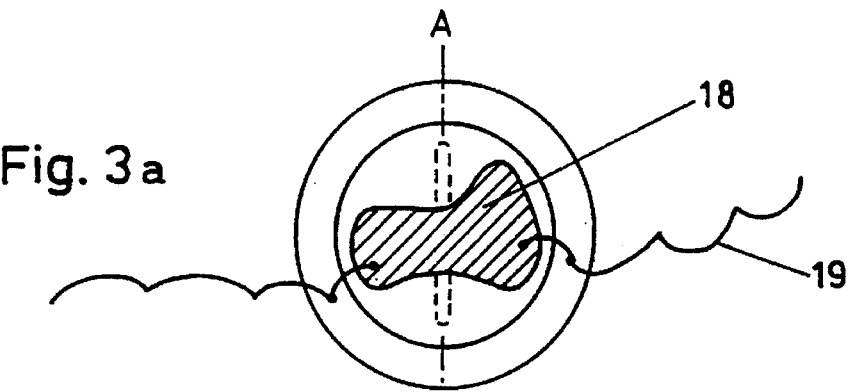
FIG. 3a is a cross-sectional view of a rupture disk provided in accordance with the present invention.
Figure 3B:
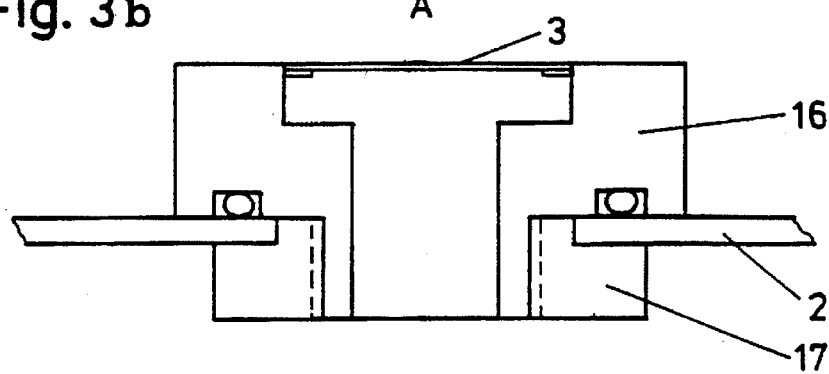

FIG. 3a shows a cell opening in the cover 2 which is enclosed by a rupture disk 3. The rupture disk 3 is held in position by a screw-on-type holder 16 having a threaded part 17. Referring also to FIG. 3b, the rupture disk 3 is preferably laser welded to the holder 16, and is coated on its top side with a conducting enamel 18. Lead wires 19 connect the conducting enamel layer 18 either to adjacent cells or to the monitoring device. The bursting of a disk, which preferably occurs along a breaking zone A-A, operates to interrupt the resulting electrical connection and produce an electrical signal in the monitoring device indicative of a damaged cell.

The improvements of the present invention can also be used in conjunction with reclosable valve structures. Such reclosable valves are particularly useful in cases where relatively slight changes in shape are indicative of a problem. In such cases, since the cell need not be replaced immediately, an optical signal is sufficient to note a problem encountered during maintenance of the battery.

Figure 4:
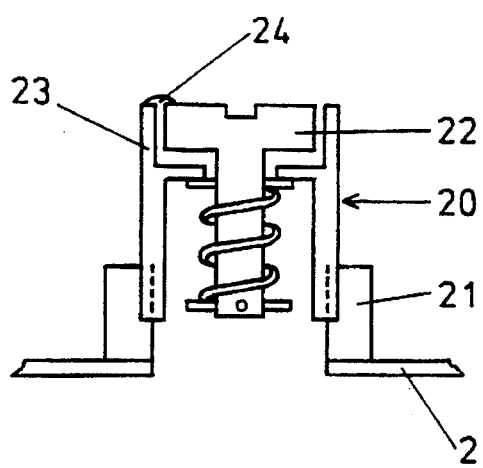
FIG. 4 is a cross-sectional view of a blow off valve provided in accordance with the present invention.
Figure 5:
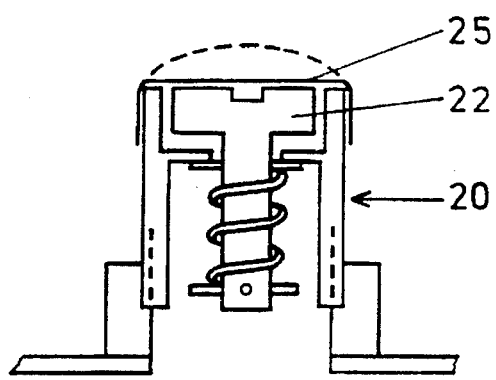
FIG. 5 is a cross-sectional view of an alternative embodiment blow-off valve construction.

FIG. 4 shows one such embodiment, which employs an electrical connection which opens upon the displacement of a valve stem. In this embodiment, a valve body 20 is received by a holder 21 associated with the cover 2. The valve body 20 defines a housing 23 for slidingly receiving a valve head 22, which is held closed under normal operating conditions. An annular gap is developed between the valve head 22 and the valve housing 23, which is bridged by a conducting enamel layer 24 (which serves as the safety). An interruption in the enamel seal 24 indicates that the valve has been displaced, providing the desired indication of a problem in the cell's operation. FIG. 5 shows an alternative to the embodiment of FIG. 4, in which a membrane 25 is mounted over the valve head 22. The membrane 25 provides the desired indication function by bulging out and rising up, thus indicating that gas has passed through the valve.

Further advantages are achievable in accordance with the present invention by combining a rupture disk and a relief valve. Moreover, this combination can be used in conjunction with the above-mentioned status indicating devices, if desired.

Figure 6:
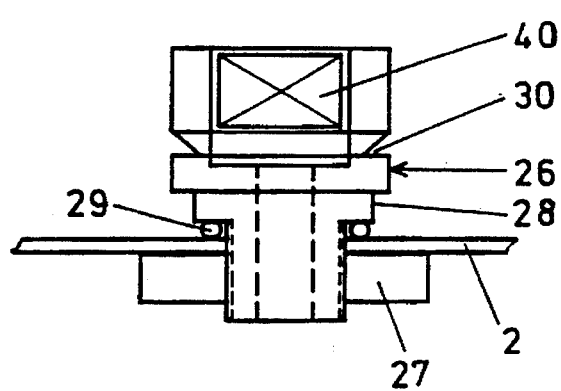
FIG. 6 is a cross-sectional view of a blow-off valve in combination with a rupturable safety.

FIG. 6 shows one such embodiment, which includes a tubular plastic body 26 associated with the cover 2 of a prismatic nickel/hydride cell (e.g., by threaded engagement with a twist-safety 27 lying under the cover 2). The body 26 includes a blow-off valve 40 at its upper end, and a flanged foot 28 at its lower end. A sealing washer 29 is advantageously positioned between the foot 28 and the cover 2. A groove 30 partially or totally surrounds the body 26 and serves as a weakened zone capable of rupturing responsive to a defined, upper pressure limit. As long as this critical pressure (e.g., 4 bar) is not reached, the blow-off valve 40 operates (below the preassigned operating pressure) to vent less severe pressure excursions.

An important feature of this arrangement is the parallel function of a valve and a rupture device. As long as only a small quantity of gas needs to escape from the cell, the valve operates and keeps the cell ready for operation. However when, as the result of a more severe mishap or a general failure, the pressure increases rapidly and a large quantity of gas needs to escape from the cell, the bursting zone responds and exposes a large crossesection of the device for venting purposes.

Figure 7:
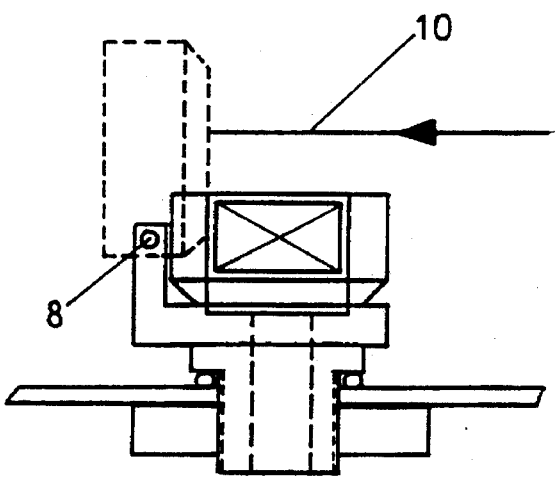
FIG. 7 is a cross-sectional view of an alternative embodiment device similar to that of FIG. 6.

In such cases, monitoring by a remote indicator can be difficult because of the relatively low excursion (stroke) of the escape valve. As a rule, it is more favorable if a direct signaling of the malfunction of the battery is triggered by the rupture device. For this, a mechanical, electrical or optical (remote) indicator must be associated with the venting structure. This can be achieved by preassigning the direction in which the body 26 and the valve 40 of FIG. 6 will move when the weakened zone at 30 tears. Alternatively, FIG. 7 shows an embodiment wherein the direction in which the blow-off valve will move (to the side) is controlled by a hinge 8. In this case, as an example, the blow-off valve can serve to interrupt a light beam 10 (passing through the cells), serving as a light barrier for signaling damage.

Figure 8:
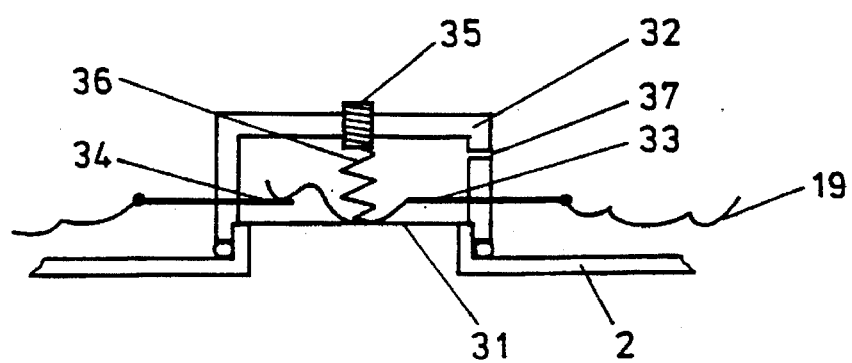
FIG. 8a is a cross-sectional view of an interruptable sensor provided in accordance with the present invention.
FIG. 8b is a cross-sectional view of an alternative embodiment interruptable sensor.

FIG. 8a shows yet another example of a pressure safety produced according to the present invention. In this embodiment, a hermetically sealed housing 32 is mounted on the cover 2 and is sealed (internally) by a membrane 31. A contact spring 33 is provided with an arm 34 which rests on the membrane 31. A pretensioning spring 36 extends between the arm 34 and a screw 35 associated with the housing 32. A ventilation hole is provided, at 37. As in the illustrative embodiment of FIG. 3, the resulting interruption sensor can be series connected to other pressure safeties or to a resistance measuring circuit by conducting wires 19 (note FIG. 9). When a critical pressure is exceeded (which can be preselected by adjusting the force of the tensioning spring 36), the circuit is interrupted. In this way, the detecting device (i.e., the resistance measuring circuit) serves to indicate a fault, and that battery operation must be stopped.

Figure 8B:
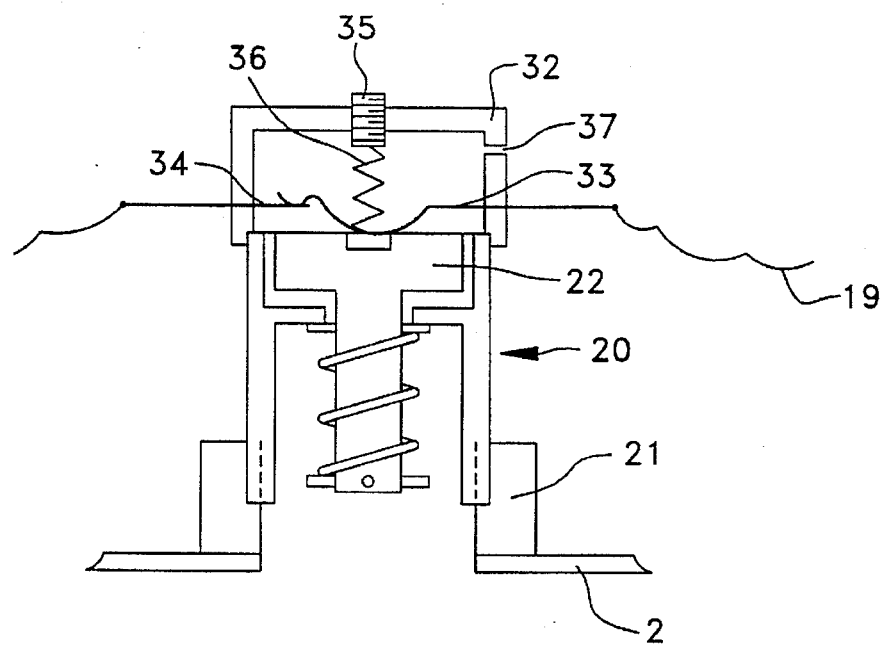

The configuration of FIG. 8a is also advantageously used with valve structures, as shown in FIG. 8b. To this end, instead of resting upon a membrane, the contact spring 33 is caused to rest on the surface of a valve head 22 of the type shown in FIGS. 4 and 5 (which is guided in the receiving body 20 associated with the cover 2). Movement of the valve head responsive to pressure fluctuations in the cell is then indicated by opening and closing of the resulting circuit.

Figure 9:
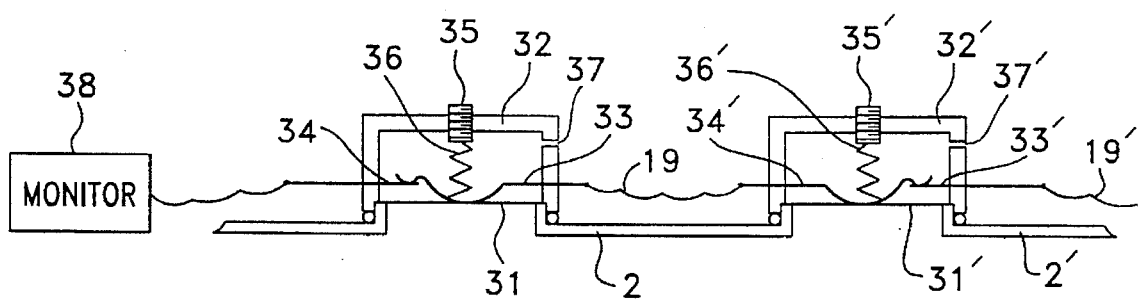

FIG. 9 shows portions of a battery including a plurality of cells fitted with the pressure safety shown in FIG. 8a. In this configuration, each of the pressure safeties is series connected (the leads 19) with adjacent pressure safeties. The resulting series combination of pressure safeties is coupled with a monitor 38, which serves to warn of a detected overpressure in one of the cells of the battery.

It will therefore be understood that various changes in the details, materials and arrangement of parts which have been herein described and illustrated in order to explain the nature of this invention may be made by those skilled in the art within the principle and scope of the invention as expressed in the following claims.

We claim:

1. A storage battery having a plurality of cells which are sealed in gas-tight manner, wherein each of the cells has a pressure safety responsive to a defined internal pressure, wherein each of the pressure safeties comprises means for producing a mechanical change in structural portions of the pressure safety responsive to the defined internal pressure, and which further comprises means for optically or electrically monitoring the mechanical change in the pressure safety independent of electrical operation of the storage battery, wherein the pressure safeties are coupled with a single monitoring means.

2. The storage battery of claim 1 wherein the pressure safeties are coupled by a light beam, and wherein the monitoring means includes means for detecting an interruption of the light beam caused by the mechanical change in the pressure safety.

3. The storage battery of claim 2 wherein the pressure safety includes a rupture disk which bursts at the defined internal pressure, and a hinged cap which blocks the light beam by folding upwardly responsive to bursting of the rupture disk.

4. The storage battery of claim 2 wherein the pressure safety includes a housing for receiving a ball valve held against a flange associated with the housing, wherein the ball valve is capable of moving past the flange responsive to the defined internal pressure and into a cage extending over the housing and located along a path defined by the light beam, for blocking the light beam responsive to movement of the ball valve from the housing into the cage.

5. The storage battery of claim 2 wherein the pressure safety includes a tubular plastic member associated with a cell of the storage battery having an upper segment for receiving a blow-off valve which is connected by a hinge to a lower segment which includes a circumferential groove forming a weakened zone, so that a rupture of the weakened zone responsive to the defined internal pressure causes the blow-off valve to block the light beam by folding upwardly at the hinge.

6. The storage battery of claim 1 wherein the pressure safeties are coupled by an electrically conducting connection, and wherein the monitoring means includes means for detecting an interruption of the electrically conducting connection caused by the mechanical change in the pressure safety.

7. The storage battery of claim 6 wherein the pressure safety includes a rupture disk having an electrically conducting enamel layer, so that bursting of the rupture disk at the defined internal pressure causes an interruption of the electrically conducting layer.

8. The storage battery of claim 6 wherein the pressure safety includes a reclosable blow-off valve sealed by a safety enamel layer, wherein the blow-off valve includes a movable valve stem for rupturing the enamel layer.

9. The storage battery of claim 6 wherein the pressure safety includes a membrane responsive to the defined internal pressure, and electrical contacts extending through the pressure safety and including an arm resting upon the membrane, so that movement of the membrane at the defined internal pressure moves the arm, interrupting the electrical connection of the electrical contacts.

10. The storage battery of claim 9 wherein the pressure safety further includes a pre-tensioning spring for engaging the arm of the electrical contacts, for retaining the arm against the membrane.

11. The storage battery of claim 6 wherein the pressure safety includes a valve head responsive to the defined internal pressure, and electrical contacts extending through the pressure safety and including an arm resting upon the valve head, so that movement of the valve head at the defined internal pressure moves the arm, interrupting the electrical connection of the electrical contacts.

12. The storage battery of claim 11 wherein the pressure safety further includes a pre-tensioning spring for engaging the arm of the electrical contacts, for retaining the arm against the valve head.

13. The storage battery of claim 1 wherein the pressure safety includes a reclosable blow-off valve, wherein the blow-off valve includes a valve head, and a membrane mounted over the valve head which bulges out responsive to gas released from the blow-off valve.

14. The storage battery of claim 1 wherein the pressure safety includes a tubular plastic member associated with the cell of the storage battery having an upper segment for receiving a blow-off valve and a lower segment which includes a circumferential groove forming a weakened zone responsive to the defined internal pressure.

15. A storage battery having a plurality of cells which are sealed in gas-tight manner, wherein each of the cells includes a cover having an opening and a pressure safety enclosing the opening, wherein each of the pressure safeties is responsive to a defined internal pressure and comprises a valve head responsive to the defined internal pressure, electrical contacts with an arm which rests on the valve head, and a spring engaging the arm, for retaining the arm against the valve head, and wherein the arm of the pressure safety produces a mechanical change in structural portions of the pressure safety responsive to the defined internal pressure, for monitoring changes in the pressure safeties resulting from increases in the internal pressure in the cells of the storage battery which exceed the defined internal pressure, independent of electrical operation of the storage battery.

16. The storage battery of claim 15 wherein the pressure safeties are coupled with a single monitor.

* * * * *